United States Patent
Sugita

(10) Patent No.: US 8,302,862 B2
(45) Date of Patent: Nov. 6, 2012

(54) CODE READING APPARATUS AND CODE READING METHOD

(75) Inventor: Nobuhiro Sugita, Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 13/197,044

(22) Filed: Aug. 3, 2011

(65) Prior Publication Data

US 2012/0037699 A1    Feb. 16, 2012

(30) Foreign Application Priority Data

Aug. 10, 2010 (JP) ................................ 2010-179747
May 30, 2011 (JP) ................................ 2011-120702

(51) Int. Cl.
G06K 15/00    (2006.01)
(52) U.S. Cl. ....................................... 235/383
(58) Field of Classification Search ................... 235/383
See application file for complete search history.

(56) References Cited

U.S. PATENT DOCUMENTS 5,818,528 A    10/1998    Roth et al.
2007/0278298 A1*    12/2007    Ali .............................. 235/383

FOREIGN PATENT DOCUMENTS

JP    10-501360    2/1998

* cited by examiner

*Primary Examiner* — Kristy A Haupt
(74) *Attorney, Agent, or Firm* — Turocy & Watson, LLP

(57) ABSTRACT

According to one embodiment, a code reading apparatus includes an image pickup section, a reading section, and a storage control section. The image pickup section picks up an image including an image of a commodity to be subjected to sales registration. The reading section reads commodity information indicating the commodity to be subjected to the sales registration from the picked-up image. The storage control section causes a commodity master file, which stores commodity information indicating a commodity and a commodity image of the commodity indicated by the commodity information in association with each other, to store the picked-up image as the commodity image in association with the read commodity information.

6 Claims, 9 Drawing Sheets

| COMMODITY CODE | COMMODITY NAME | UNIT PRICE | VOLUME | COMMODITY IMAGE |
|---|---|---|---|---|
| 2012300000015 | ×××× | US$2 | 500 ml | |
| 4900000000016 | △△△△ | US$1 | 500 ml | |
| 4900000000023 | □□□□ | US$3 | 500 ml | |
| ⋮ | ⋮ | ⋮ | ⋮ | ⋮ |

| COMMODITY CODE | COMMODITY NAME | UNIT PRICE | VOLUME | COMMODITY IMAGE |
|---|---|---|---|---|
| 2012300000015 | ×××× | US$2 | 500 ml | |
| 4900000000016 | △△△△ | US$1 | 500 ml | |
| ⋮ | ⋮ | ⋮ | ⋮ | ⋮ |

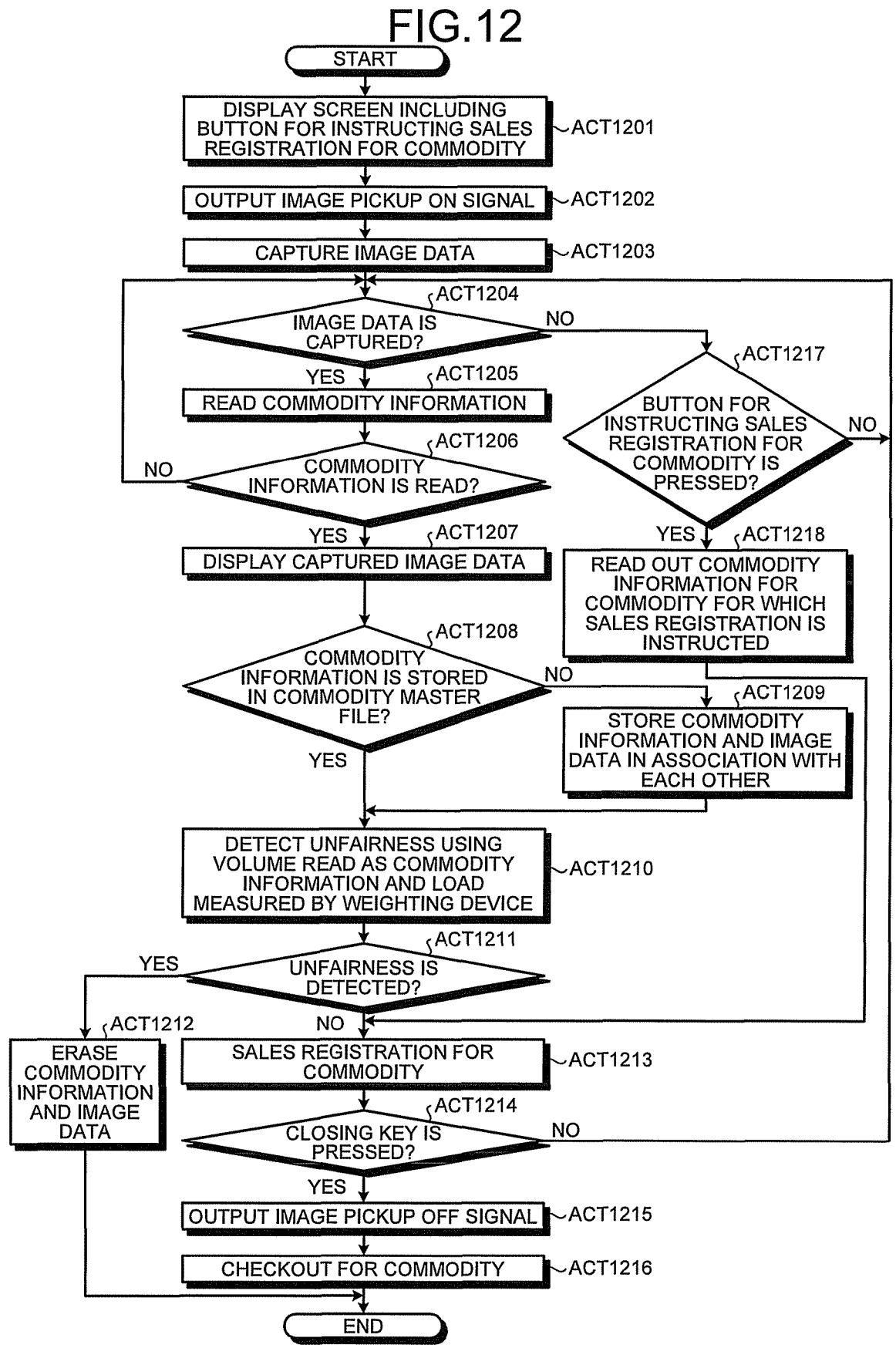

CODE READING APPARATUS AND CODE READING METHOD

CROSS-REFERENCE TO RELATED APPLICATIONS

This application is based upon and claims the benefit of priority from the prior Japanese Patent Applications No. 2010-179747, filed on Aug. 10, 2010 and No. 2011-120702, filed on May 30, 2011; the entire contents all of which are incorporated herein by reference.

FILED

Embodiments described herein relate generally to a code reading apparatus and a code reading method.

BACKGROUND

In the past, a supermarket or the like uses a code reading apparatus that picks up an image of a code symbol such as a barcode affixed to a commodity using an image sensor such as a CCD camera, reads code data from a barcode included in the picked-up image, and performs, referring to a commodity master file, sales registration for the commodity specified by the read code data.

For example, among code reading apparatuses, there is a handy-type scanner that decodes a label image picked up by a CCD camera. On the other hand, with a vertical scanner vertically provided on a counter of a supermarket or the like, an operator can handle commodities using both the hands. Therefore, work efficiency can be improved to be higher than work efficiency in picking up the label image using the handy-type scanner.

When sales registration or checkout for commodities is performed, the code reading apparatus can display, on a touch panel or the like, buttons on which commodity images stored in the commodity master file in advance are displayed and can also perform sales registration or checkout for commodities according to operation of the buttons. However, in order to display, on the touch panel or the like, the buttons on which the commodity images are displayed, an operator has to pick up an image of an unregistered commodity not registered in the commodity master file and cause the commodity master file to store the picked-up image. Therefore, there is a problem in that it takes labor and time to manage the commodity master file.

DESCRIPTION OF THE DRAWINGS

FIG. 12 is a flowchart for explaining a procedure of sales registration for a commodity by the settlement terminal.

DETAILED DESCRIPTION

In general, according to one embodiment, a code reading apparatus includes an image pickup section, a reading section, and a storage control section. The image pickup section picks up an image including an image of a commodity to be subjected to sales registration. The reading section reads commodity information indicating the commodity to be subjected to the sales registration from the picked-up image. The storage control section causes a commodity master file, which stores commodity information indicating a commodity and a commodity image of the commodity indicated by the commodity information in association with each other, to store the picked-up image as the commodity image in association with the read commodity information.

Figure 1:
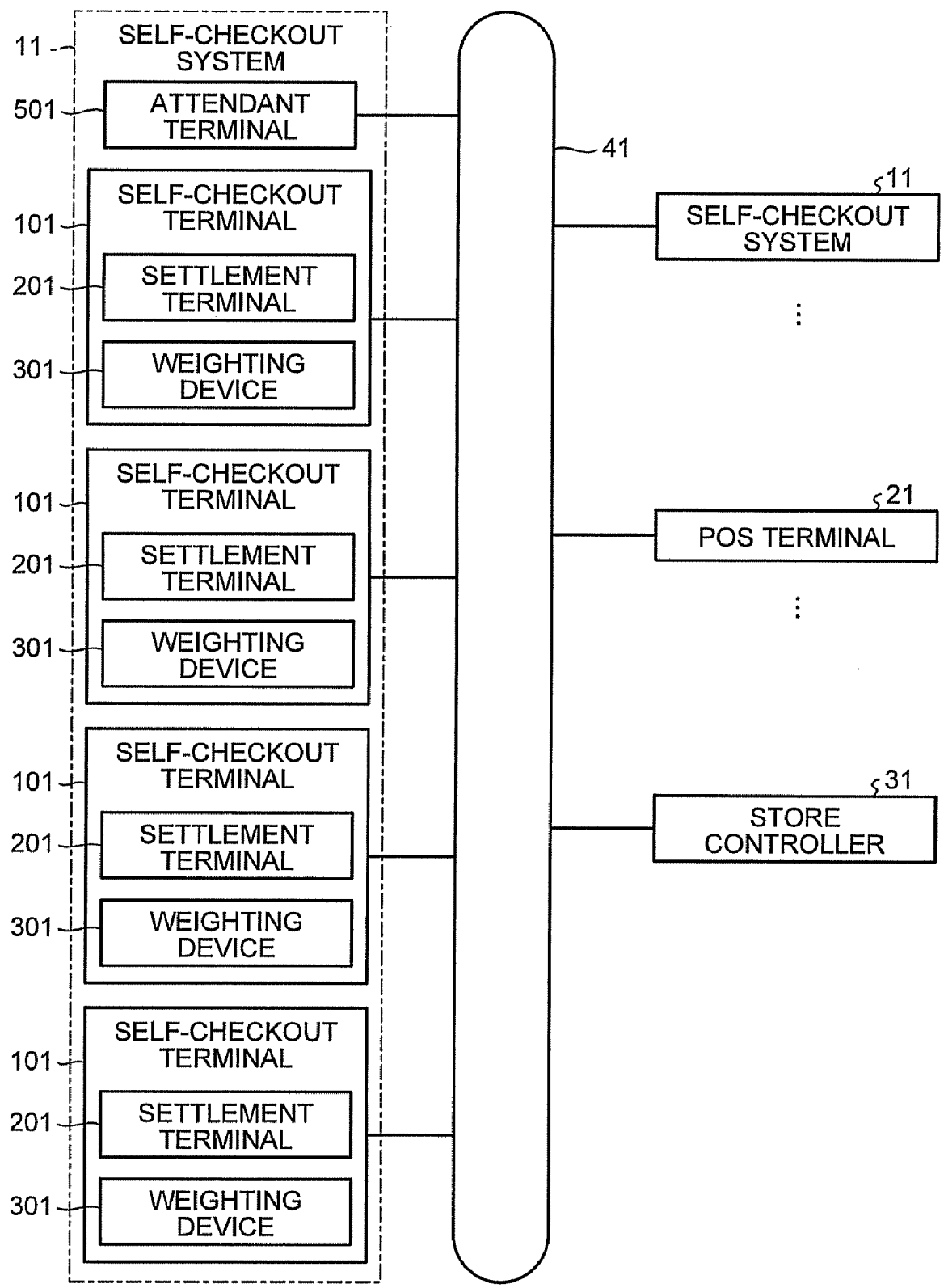
FIG. 1 is a schematic diagram of an overall system configuration.

FIG. 1 is a schematic diagram of an overall system configuration. In a system according to an embodiment, plural self-checkout systems 11, plural POS (Point Of Sales) terminals 21, and a store controller 31 are connected via a communication network 41. The self-checkout system 11 allocates one attendant terminal 501 to plural self-checkout terminals 101. The self-checkout terminal 101 is a terminal for reading, from a barcode or the like affixed to a commodity to be subjected to sales registration, commodity information indicating the commodity to be subjected to the sales registration and performing the sales registration or the like for the commodity indicated by the read commodity information. In this embodiment, the self-checkout terminal 101 includes a settlement terminal 201 and a weighting device 301.

Figure 2:
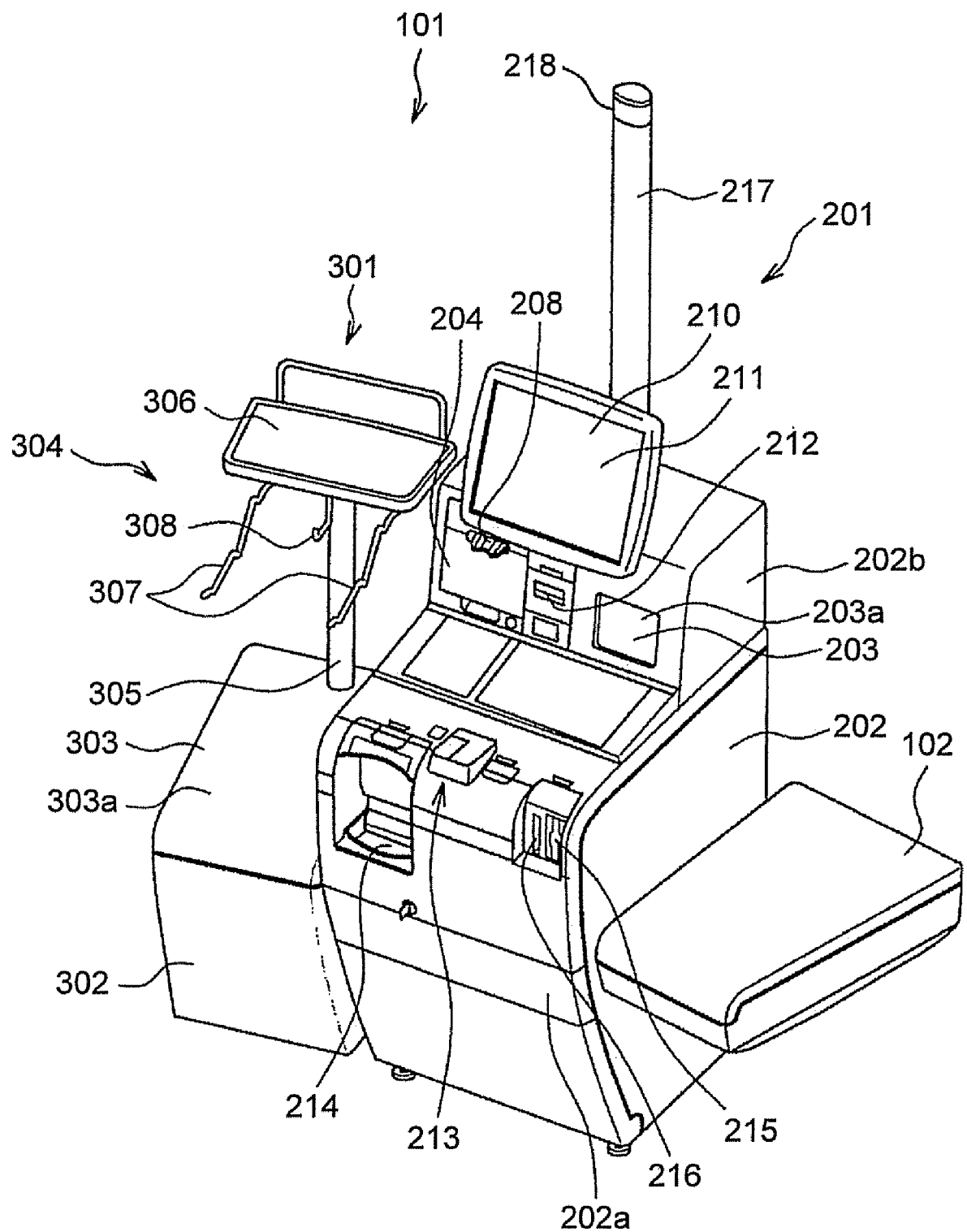
FIG. 2 is a perspective view of a self checkout terminal.

FIG. 2 is a perspective view of the self-checkout terminal. The self-checkout terminal 101 includes the settlement terminal 201 and the weighting device 301 as explained above.

The settlement terminal 201 includes a housing 202, from a side of which a commodity basket placing table 102 for placing a basket (not shown) including commodities, which a customer is about to purchase, projects.

The housing 202 of the settlement terminal 201 includes a base housing 202a set on a floor surface and an upper housing 202b placed on an upper surface of the base housing 202a. A front surface of the base housing 202a tilts to reduce a projection area of the base housing 202a to be smaller toward the bottom of the base housing 202a. In other words, the base housing 202a has a shape further offset to the depth side toward the bottom of the base housing 202a.

In the settlement terminal 201, a camera 203 such as a CCD (Charge Coupled Device) camera is arranged on the commodity basket placing table 102 side of the upper housing 202b. A printer cover 204 is arranged on the opposite side of the commodity basket placing table 102 of the upper housing 202b. Further, a card insertion port 212 is arranged between the camera 203 and the printer cover 204.

In the settlement terminal 201, the camera 203 is incorporated on the inside of a reading window 203a formed of a glass plate. The camera 203 is an image pickup section configured to pickup an image including an image of a commodity to be subjected to sales registration. In this embodiment, the camera 203 picks up, for example, a label image, which is an image of a label that is affixed to the commodity to be subjected to the sales registration and on which a code symbol or the like such as a barcode or a two-dimensional code is displayed.

In the settlement terminal 201, the printer cover 204 is attached to the upper housing 202b to open and close freely. The printer cover 204 includes a receipt issue port 208. A receipt printer 251 (see FIG. 4) is incorporated on the depth side of the printer cover 204. The settlement terminal 201 issues, from the receipt issue port 208, a not-shown receipt printed by the receipt printer 251.

In the settlement terminal 201, a card reader writer 252 (see FIG. 4), which is a magnetic card reader writer for enabling reading of data from and writing of data in a magnetic card, is incorporated on the inside of the card insertion port 212. In the card insertion port 212, a credit card is inserted as the magnetic card.

The settlement terminal 201 includes, in the upper housing 202b, an LCD (Liquid Crystal Display) 210 functioning as a display section configured to display a name, a price, an image, and the like of a commodity subjected to sales registration to a customer. Further, in the settlement terminal 201, a touch panel 211 functioning as an input section is laminated and arranged on a screen of the LCD 210. On the touch panel 211, for example, various keys for receiving input if sales registration for, for example, a commodity that cannot be subjected to sales registration with a code symbol is performed and a closing key necessary for settlement of a commodity price are arranged.

In the settlement terminal 201, a depositing and dispensing device 221 (see FIG. 4) for coins and bills is incorporated in the base housing 202a. A coin depositing port 213 is arranged on the upper surface in the center of the base housing 202a as a part of the depositing and dispensing device 221. A coin dispensing port 214 is arranged on the left side of the coin depositing port 213. A bill depositing port 215 and a bill dispensing port 216 are arranged on the right side of the coin depositing port 213. The depositing and dispensing device 221 includes a mechanism section configured to handle coins and bills and a control section configured to control the mechanism section (both the sections are not shown). Details of the structure of the mechanism section configured to handle coins and bills, a processing procedure in the control section configured to control the mechanism section, and the like are well-known. Therefore, explanation of the structure, the processing procedure, and the like is omitted.

In the settlement terminal 201, a display pole 217 functioning as a warning device configured to display a present state of the self-checkout terminal 101 is vertically provided from a rear surface of the base housing 202a. The display pole 217 includes, at a distal end thereof, a light emitting section 218 configured to selectively emit light in blue and red.

Figure 3:
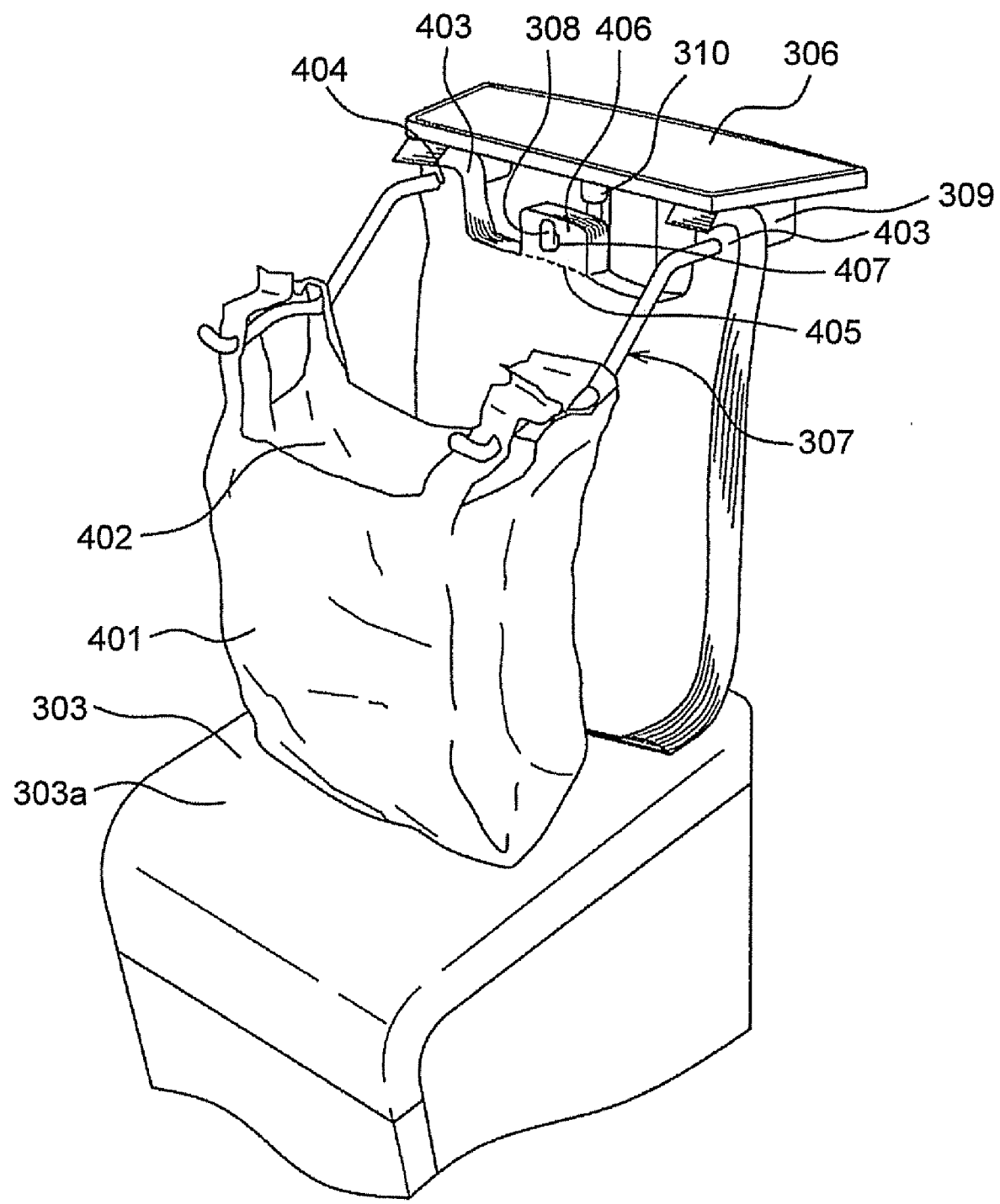
FIG. 3 is a perspective view of a state in which a register bag is held by holding arms.

The weighting device 301 is explained below with reference to FIGS. 2 and 3. FIG. 3 is a perspective view of a state in which a register bag is held by holding arms. In the weighting device 301, a scale pan 303 is provided in an upper part of a weighting housing 302. A bag holder 304 is attached to the scale pan 303. The scale pan 303 includes a placing table 303a on an upper surface thereof. The bag holder 304 is attached to the placing table 303a. Therefore, for the bag holder 304, the scale pan 303 is a pedestal. An arm supporting section 305 having a pole shape is vertically provided in the center in the back of the placing table 303a. A temporary placing table 306 for placing a commodity is fixed to an upper end of the arm supporting section 305. An upper surface of the temporary placing table 306 is a flat surface. The temporary placing table 306 is a table used for temporarily placing a commodity after an image of the commodity and an image of a code symbol of the commodity are picked up by the camera 203 of the settlement terminal 201. Both of the placing table 303a and the temporary placing table 306 play a role of a placing section for placing a commodity, a commodity code of which is input.

In the weighting device 301, a pair of holding arms 307 and a hook 308 are attached to a lower surface of the temporary placing table 306. In other words, arm fittings 309 (see FIG. 3) are fixed in both end positions of the lower surface of the temporary placing table 306. Specifically, the arm fittings 309 are fixed in the both end positions of the lower surface of the temporary placing table 306 by any one of various fixing methods such as screwing and bonding. The holding arms 307 are respectively embedded in the arm fittings 309. A hook fitting 310 (see FIG. 3) is fixed in the center position of the lower surface of the temporary placing table 306. Specifically, the hook fitting 310 is fixed to the center position of the lower surface of the temporary placing table 306 by any one of various fitting methods such as screwing and bonding. The hook 308 is embedded in the hook fitting 310.

In order to hold a register bag 401 serving as a storing member such as a plastic bag provided to a customer in a supermarket or the like, i.e., the register bag 401 that has an opening 402 and a pair of grips 403 projecting from the opening 402 and is folded such that the grips 403 are located on both sides, the holding arms 307 hold the pair of grips 403 in a pierced state. In order to hold the grips 403 in the pierced state, slits 404 are provided in the grips 403 of the register bag 401. The register bag 401 includes a pair of ears 406 that are located between the pair of grips 403 and can be torn off along perforations 405. The ears 406 include hooking holes 407. The hook 308 is inserted through the hooking holes 407 and holds the register bag 401 in conjunction with the holding arms 307.

Figure 4:
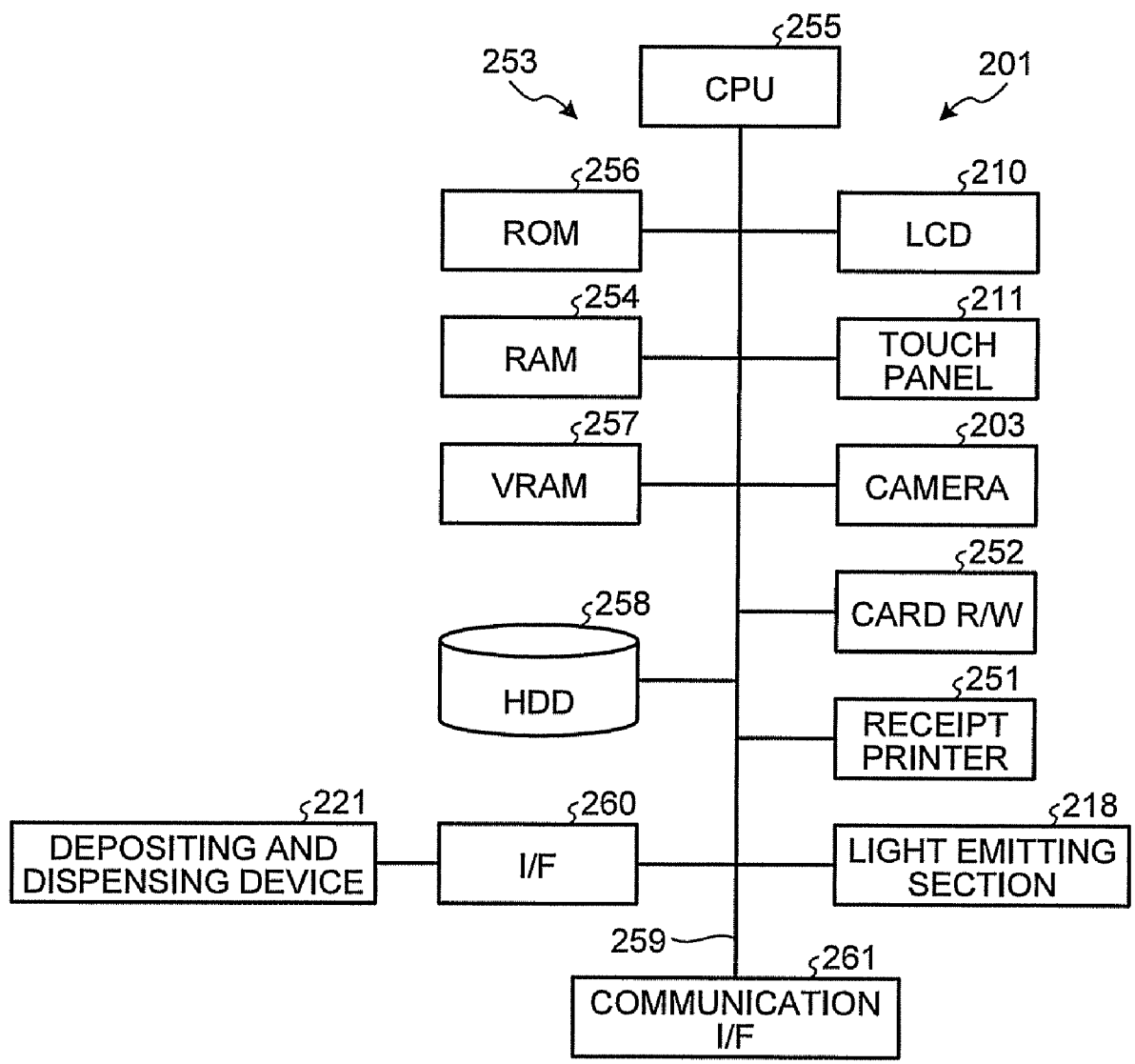
FIG. 4 is a block diagram of an electric hardware configuration of a settlement terminal.

FIG. 4 is a block diagram of an electric hardware configuration of the settlement terminal. The settlement terminal 201 includes a control section 253 functioning as an information processing section on the inside thereof. For example, the control section 253 may be a control section having a semiconductor chip configuration in which an operation sequence is written or may be a control section having a microcomputer configuration that operates while causing a RAM (Random Access Memory) 254 or the like to store an operation program. The control section 253 having the microcomputer configuration is introduced below.

The core of the control section 253 is a CPU (Central Processing Unit) 255. In the control section 253, a ROM (Read Only Memory) 256 having fixed data fixedly stored therein, the RAM 254 configured to rewritably store variable data, a VRAM 257 configured to generate a display image to be displayed on the LCD 210, and a HDD 258 are connected to the CPU 255 via a system bus 259.

In the settlement terminal 201, the camera 203, the LCD 210, the touch panel 211, the card reader writer 252, the receipt printer 251, the light emitting section 218, and an interface 260 configured to mediate data communication between the settlement terminal 201 and the depositing and dispensing device 221 are connected to the control section 253 via the system bus 259. The control section 253 controls the camera 203, the LCD 210, the touch panel 211, the card reader writer 252, the receipt printer 251, the light emitting section 218, and the interface 260. A communication interface 261 is also connected to the control section 253 via the system bus 259. The communication interface 261 is connected to the communication network 41 and realizes data communication between the attendant terminal 501 and the store controller 31 and the self-checkout terminal 101. Although not shown in the figure, an interface configured to realize data communication between the settlement terminal 201 and the weighting devices 301 is also connected to the control section 253 via the system bus 259.

Figures 5, 6:
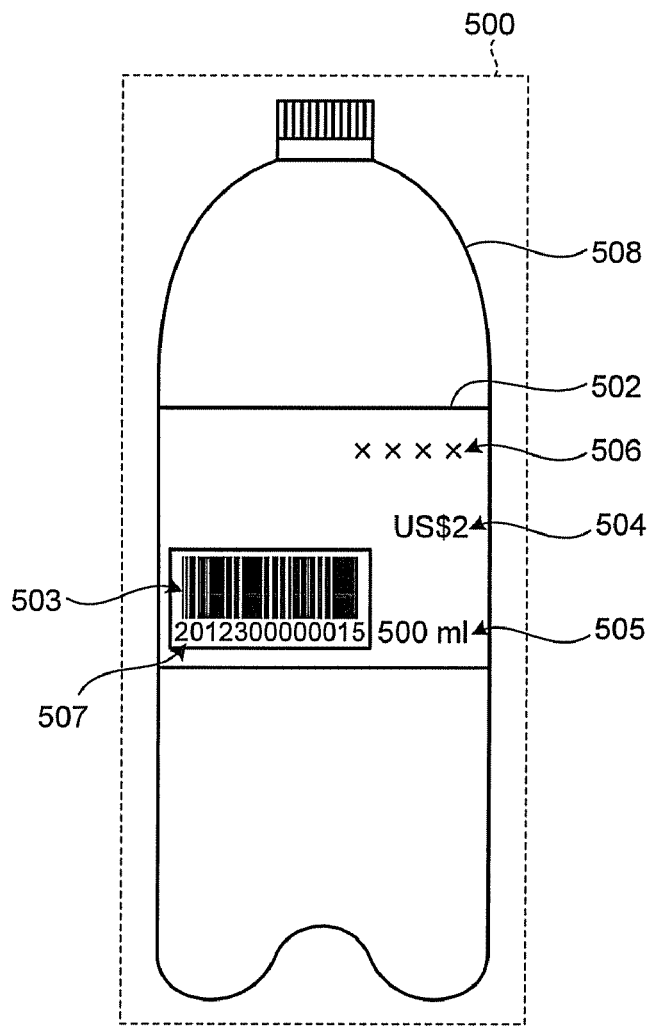
FIG. 5 is a diagram for explaining an example of a relation between a commodity and an image-pickup area of a camera.
FIG. 6 is a diagram for explaining a commodity master file.

As explained above, the camera 203 picks up an image including an image of a commodity to be subjected to sales registration and a label image of a label affixed to the commodity. A relation between a commodity processed by the settlement terminal 201 according to this embodiment and an image pickup area of the camera 203 is explained with reference to FIG. 5. FIG. 5 is a diagram for explaining an example of a relation between a commodity and the image pickup area of the camera. An area surrounded by a dashed line is an image pickup area 500, which is an area in which the camera 203 can pick up an image in one frame. The camera 203 picks up images including an image of a commodity 508 included in the image pickup area 500 and a label image of a label 502 affixed to the commodity 508 and printed with a barcode 503.

The label 502 displays information necessary for subjecting sales data of the commodity 508 to sales registration in the POS terminal 21. Specifically, the label 502 displays, for example, the barcode 503 serving as a code symbol incorporating a commodity name 506 of the commodity 508: "xxxx", a unit price 504 of the commodity 508: "US$2", a volume 505 of the commodity 508: "500 ml", and a commodity code for identifying the commodity 508. The label 502 displays, under the barcode 503, as a number, a commodity code 507: "2012300000015" incorporated in the barcode 503.

The HDD 258 has stored therein, besides a computer program for causing the control section 253 to operate, for example, a commodity master file T (see FIG. 6) and a sales file that stores sales data and the like. FIG. 6 is a diagram for explaining the commodity master file. The commodity master file T is a storing section configured to store, in association with commodity information indicating a commodity code for identifying a commodity, a commodity name of the commodity, a unit price of the commodity, and a volume of the commodity, a commodity image of the commodity indicated by the commodity information and the like.

Figure 7:
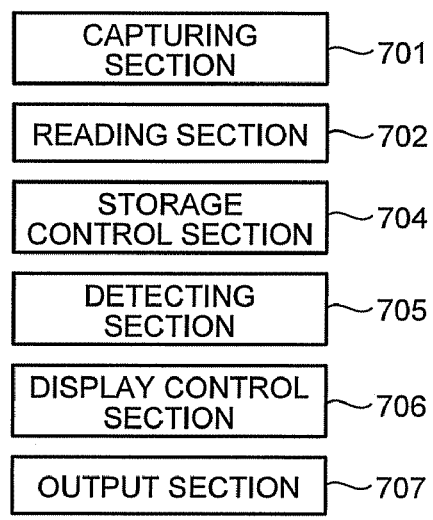
FIG. 7 is a block diagram of a functional configuration of the settlement terminal according to an embodiment.

Characteristic functions of the settlement terminal 201 according to this embodiment are explained. FIG. 7 is a block diagram of a functional configuration of the settlement terminal according to this embodiment. The CPU 255 operates according to the computer program stored in the HDD 258 and expanded in the RAM 254 to function as a capturing section 701, a reading section 702, a storage control section 704, a detecting section 705, a display control section 706, and an output section 707 as shown in FIG. 7.

If the capturing section 701 receives an instruction of the reading section 702, the capturing section 701 outputs an image pickup ON signal to the camera 203 and causes the camera 203 to start an image pickup operation. The capturing section 701 captures image data of an image of the image pickup area 500 (see FIG. 5) picked up by the camera 203 and stores the image data in the RAM 254.

Figure 8:
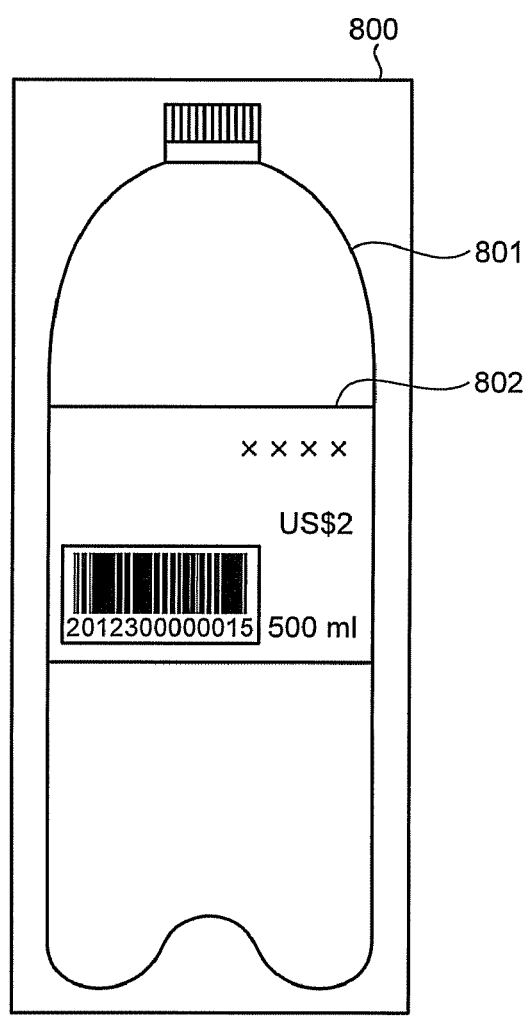
FIG. 8 is a diagram of an example of image data captured by a capturing section.

FIG. 8 is a diagram of an example of the image data captured by the capturing section. As shown in FIG. 8, image data 800 captured by the capturing section 701 includes a label image 802, which is an image of the label 502 that is affixed to the commodity 508 to be subjected to sales registration and on which the commodity name 506, the unit price 504, the volume 505, the barcode 503, and the like are displayed and an image 801 of the commodity 508, which is an image of the commodity 508 to be subjected to sales registration and is located in the image pickup area 500.

The reading section 702 reads commodity information indicating a commodity to be subjected to sales registration from the image data 800 stored in the RAM 254 by the capturing section 701. The commodity information is information indicating the commodity to be subjected to the sales registration and includes a commodity code for identifying the commodity to be subjected to the sales registration, a commodity name of the commodity, a unit price of the commodity, and a volume of the commodity. In this embodiment, the reading section 702 reads the commodity code, the commodity name, the unit price, and the volume as the commodity information. However, the reading section 702 only has to read at least one of the commodity code, the commodity name, the unit price, the volume, and the like. For example, the reading section 702 may read only the commodity name among the commodity code, the commodity name, the unit price, the volume, and the like as the commodity information. The reading section 702 may read all of the commodity code, the commodity name, the unit price, and the volume as the commodity information.

Specifically, the reading section 702 detects an image of the barcode 503 included in the label image 802 included in the image data 800. Subsequently, the reading section 702 recognizes a commodity code of the commodity 508 from the detected image of the barcode 503 and outputs the commodity code as commodity information. In this embodiment, an operation including the detection of the image of the barcode 503 and the output of the commodity information by the reading section 702 is expressed as reading.

More specifically, the reading section 702 binarizes the image data 800 of one frame stored in the RAM 254. The reading section 702 detects whether a data region concerning the barcode 503 is present in the binarized data. If the reading section 702 detects the data region concerning the barcode 503 in the captured image data 800, the reading section 702 reads, as the commodity information of the commodity 508, barcode data (a JAN code) obtained by decoding the data region concerning the barcode 503. The barcode data includes a manufacturer code, a commodity code serving as commodity information, and a check digit. The reading section 702 stores the read barcode data in the RAM 254.

The reading section 702 applies character recognition by an OCR (Optical Character Reader) or the like to the image data 800 of one frame stored in the RAM 254 to thereby read, as the commodity information, the commodity name 506, the unit price 504, the volume 505, and the like included in, for example, the label image 802 of the label 502. The reading section 702 stores the read commodity information such as the commodity name 506, the unit price 504, and the volume 505 in the RAM 254.

The storage control section 704 causes the commodity master file T stored in the HDD 258 to store, as the commodity information, the image data 800 stored in the RAM 254 by the capturing section 701 in association with the commodity information (e.g., the commodity code included in the barcode data, the commodity name 506, the unit price 504, and the volume 505) read by the reading section 702 and stored in the RAM 254.

In this embodiment, if the commodity information is stored in the RAM 254 by the reading section 702, the storage control section 704 determines whether the commodity code included in the barcode data stored in the RAM 254 as the commodity information is already stored in the commodity master file T. In other words, the storage control section 704 determines whether the commodity information read by the reading section 702 is stored in the commodity master file T. If the storage control section 704 determines that the commodity code included in the barcode data is not stored in the commodity master file T, the storage control section 704 causes the commodity master file T to store the commodity code included in the barcode data stored in the RAM 254, the commodity name 506, the unit price 504, the volume 505, and the like and the image data 800 stored in the RAM 254 in association with each other. Consequently, an operator does not need to pick up an image of the commodity 508 and cause the commodity master file T to store commodity information and a commodity image using the picked-up image of the commodity 508. Therefore, it is possible to realize simplification of maintenance of the image of the commodity 508 stored in the commodity master file T.

In this embodiment, the storage control section 704 causes the commodity master file T to store the image data 800 stored in the RAM 254. However, the storage control section 704 may extract the image 801 of the commodity 508 from the image data 800 stored in the RAM 254 and cause the commodity master file T to store the extracted image 801 of the commodity 508 in association with the commodity information read by the reading section 702. Specifically, the storage control section 704 sets in advance a background image serving as a background of the commodity image 801. The storage control section 704 detects an image excluding the background image set in advance from the image data 800 stored in the RAM 254 to thereby extract the image 801 of the commodity 508. The background image is an image of clothing or the like of the operator who operates the settlement terminal 201. For example, if the operator is a store clerk of a store where the settlement terminal 201 is set, the storage control section 704 sets an image of an apron worn by the store clerk as the background image.

The detecting section 705 determines, using the volume 505 stored in the RAM 254 as the commodity information by the reading section 702 and a load measured by the weighting device 301, whether a commodity, commodity information of which is not read, is stored in the register bag 401. If weight converted from the volume 505 stored in the RAM 254 as the commodity information by the reading section 702 and the load measured by the weighting device 301 do not coincide with each other, the detecting section 705 detects unfairness.

Figure 9:
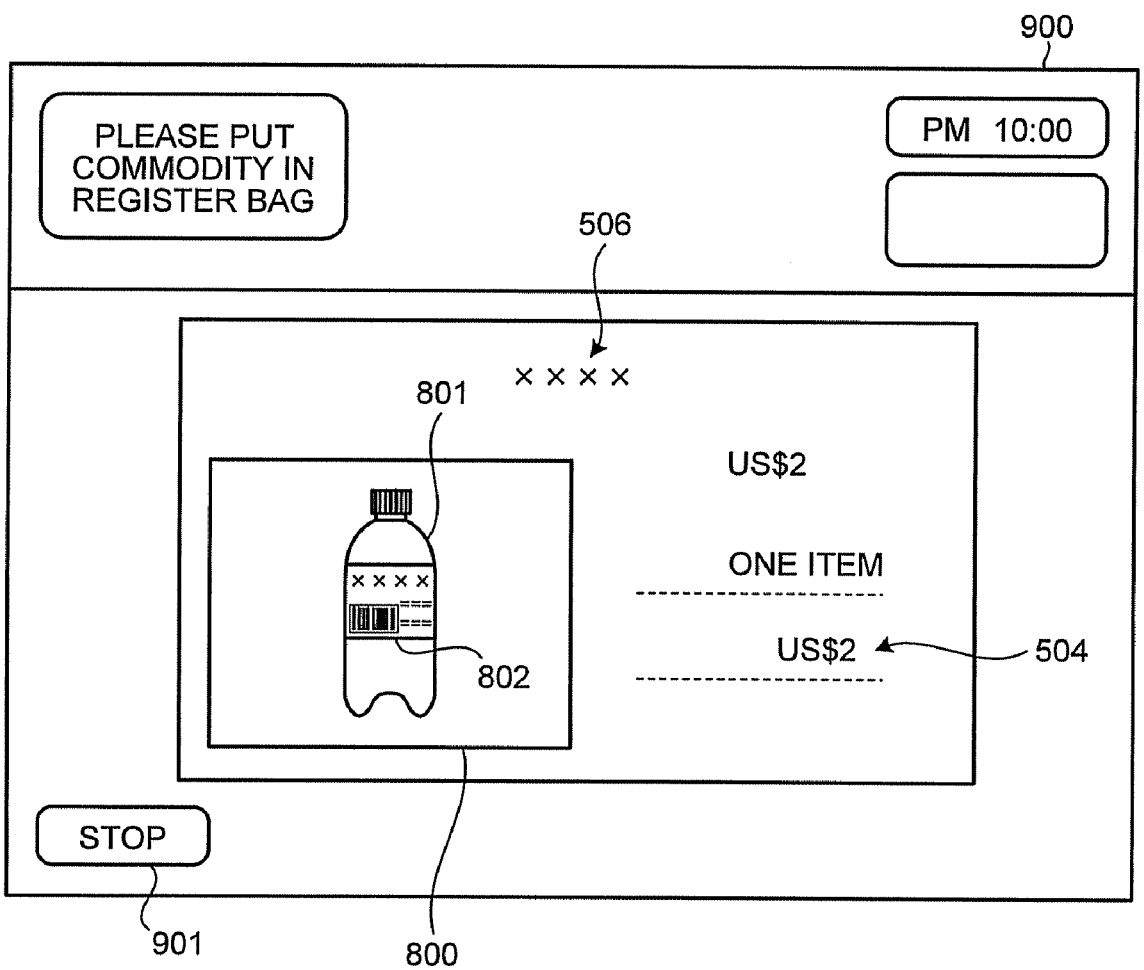
FIG. 9 is a diagram of a display example of image data.

The display control section 706 displays the image data 800 captured by the capturing section 701 on the LCD 210. FIG. 9 is a diagram of a display example of the image data. When the commodity information is read by the reading section 702, the display control section 706 generates, on the VRAM 257, a screen 900 including the image data 800 captured by the capturing section 701 and the commodity information such as the commodity name 506: "xxxx" and the unit price 504: "US$2" read by the reading section 702 as shown in FIG. 9. In this embodiment, the display control section 706 generates the screen 900 including, in addition to the image data 800 and the commodity information, a stop button 901 for requesting a stop of the storage of the image data 800 and the commodity information in the commodity master file T. The display control section 706 causes the LCD 210 to display the screen 900 generated on the VRAM 257. Consequently, the operator can perform reading work for the commodity information while checking whether the commodity 508, the commodity information of which is read, is a desired commodity. Therefore, it is possible to prevent an undesired commodity from being subjected to sales registration by mistake.

Figures 10, 11:
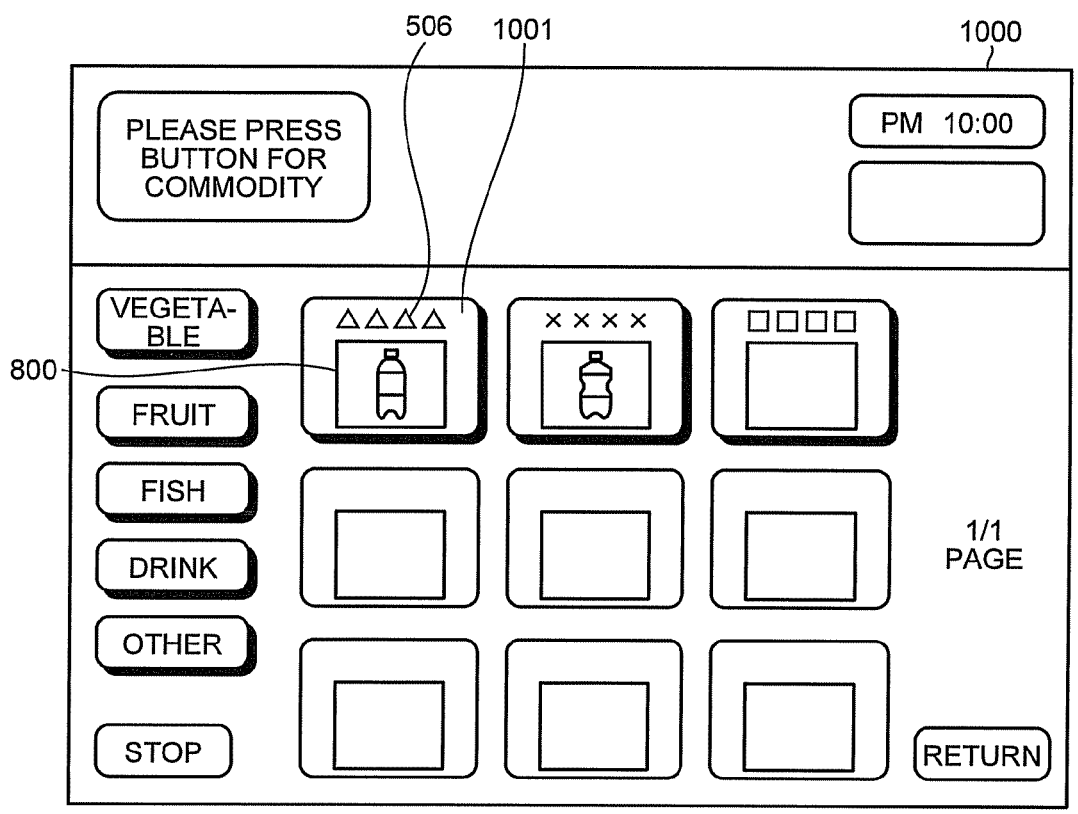
FIG. 10 is a diagram of a display example of buttons for instructing sales registration for commodities.
FIG. 11 is a diagram of a printing example of a commodity ledger.

The display control section 706 displays, while sales registration for a commodity is performed, on the LCD 210, a button on which a commodity image stored in the commodity master file T is displayed and that is used for instructing the sales registration for the commodity. FIG. 10 is a diagram of a display example of the button for instructing sales registration for a commodity. As shown in FIG. 10, the display control section 706 generates, on the VRAM 257, a screen 1000 including a button 1001 that is used for instructing sales registration for a commodity and on which the image data 800, which is the commodity image stored in the commodity master file T, and the commodity information such as the commodity name 506 associated with the image data 800 are displayed. The display control section 706 causes the LCD 210 to display the screen 1000 generated on the VRAM 257. Consequently, the operator can perform sales registration work for the commodity while checking the image data 800 displayed on the button 1001. Therefore, it is possible to prevent an undesired commodity from being subjected to sales registration by mistake.

A method of displaying the screen 1000 on the LCD 210 is briefly explained. When sales registration for a commodity is performed, the display control section 706 reads out, from the commodity master file T, the commodity name 506 and the image data 800 associated with the commodity name 506. Subsequently, the display control section 706 generates, on the VRAM 257, the screen 1000 displaying the button 1001 on which the read-out commodity name 506 and the read-out image data 800 are displayed. The display control section 706 displays, while the sales registration for the commodity is performed, the screen 1000 generated on the VRAM 257 on the LCD 210.

Further, if the button 1001 is pressed on the screen 1000 shown in FIG. 10, the display control section 706 reads out a commodity code of the commodity, the sales registration of which is instructed using the button 1001, from the commodity master file T. The display control section 706 stores the read-out commodity code in the RAM 254 as barcode data.

The output section 707 outputs the barcode data stored in the RAM 254 to the POS terminal 21 via the communication I/F 261.

If output of a commodity ledger is requested by the keys arranged on the touch panel 211, the output section 707 outputs the commodity master file T to a host apparatus such as a server as the commodity ledger and requests printing of the commodity ledger by a printer (not shown) of the host apparatus. FIG. 11 is a diagram of a printing example of the commodity ledger. In this embodiment, as shown in FIG. 11, the output section 707 outputs the commodity master file T to the host apparatus as the commodity ledger and prints, with the printer of the host apparatus, a commodity ledger 1100 shown in FIG. 11.

Sales registration for a commodity by the settlement terminal 201 is explained below with reference to FIG. 12. FIG. 12 is a flowchart for explaining a procedure of sales registration for a commodity by the settlement terminal.

The CPU 255 of the settlement terminal 201 starts sales registration for a commodity when the start of a job is instructed by a command from the POS terminal 21. When the sales registration for the commodity is started, the display control section 706 displays, on the LCD 210, the screen 1000 (see FIG. 10) including the button 1001 (see FIG. 10) for instructing the sales registration for the commodity (Act 1201). The capturing section 701 outputs an image pickup ON signal to the camera 203 and causes the camera 203 to start an image pickup operation (Act 1202). The capturing section 701 captures image data of an image of the image pickup area 500 picked up by the camera 203 (Act 1203).

If the image data is not captured (No in Act 1204), the CPU 255 determines, from the commodity master file T, whether the button 1001 for instructing the sales registration for the commodity is pressed (Act 1217). If the button 1001 is pressed (Yes in Act 1217), the CPU 255 reads out, from the commodity master file T, commodity information of the commodity for which the sales registration is instructed by the pressed button 1001 and stores the read-out commodity information in the RAM 254 (Act 1218). Subsequently, the CPU 255 stores the commodity information stored in the RAM 254 in the HDD 258 and performs the sales registration for the commodity (Act 1213). Thereafter, if the closing key displayed on the LCD 210 is pressed (Yes in Act 1214), the capturing section 701 outputs an image pickup OFF signal to the camera 203 and ends the image pickup operation by the camera 203 (Act 1215). Further, if the closing key displayed on the LCD 210 is depressed (Yes in Act 1214), the CPU 255 performs checkout for the commodity subjected to the sales registration referring to the commodity information stored in the HDD 258 (Act 1216). If the closing key displayed on the LCD 210 is not pressed (No in Act 1214), the processing returns to Act 1204 and the capturing section 701 continues to capture image data picked up by the camera 203.

On the other hand, if the button 1001 for instructing the sales registration for the commodity is not pressed (No in Act 1217), the processing returns to Act 1204 and the capturing section 701 continues to capture image data picked up by the camera 203.

If the image data is captured (Yes in Act 1204), the reading section 702 reads commodity information indicating the commodity to be subjected to the sale registration from the captured image data (Act 1205). If the commodity information is read by the reading section 702 (Yes in Act 1206), the display control section 706 displays, on the LCD 210, the screen 900 (see FIG. 9) including the image data 800 captured by the capturing section 701 (Act 1207). If the commodity information is not read by the reading section 702 (No in Act 1206), the processing returns to Act 1204 and the capturing section 701 continues to capture image data picked up by the camera 203.

The storage control section 704 determines whether the commodity information read by the reading section 702 is stored in the commodity master file T stored in the HDD 258 (Act 1208). If the read commodity information is stored in the commodity master file T (Yes in Act 1208), the detecting section 705 detects unfairness using a volume included in the read commodity information and a load measured by the weighting device 301 (Act 1210).

On the other hand, if the commodity information read by the reading section 702 is not stored in the commodity master file T stored in the HDD 258 (No in Act 1208), the storage control section 704 causes the commodity master file T to store the commodity information read by the reading section 702 and stored in the RAM 254 and the image data captured by the capturing section 701 in association with each other (Act 1209). Thereafter, the detecting section 705 detects unfairness using a volume included in the read commodity information and a load measured by the weighting device 301 (Act 1210).

If unfairness is not detected by the detecting section 705 (No in Act 1211), the CPU 255 stores, in the HDD 258, the commodity information read by the reading section 702 and stored in the RAM 254 and performs the sales registration for the commodity (Act 1213). On the other hand, if unfairness is detected by the detecting section 705 (Yes in Act 1211), the detecting section 705 erases the commodity information and the image data stored in the RAM 254 and stops the sales registration for the commodity (Act 1212).

Thereafter, if the closing key displayed on the LCD 210 is pressed and the end of the reading of the commodity information is instructed (Yes in Act 1214), the capturing section 701 outputs an image pickup OFF signal to the camera 203 and ends the image pickup operation by the camera 203 (Act 1215). If the closing key displayed on the LCD 210 is further pressed (Yes in Act 1214), the CPU 255 performs checkout of the commodity subjected to the sales registration referring to the commodity information stored in the HDD 258 (Act 1216). If the closing key displayed on the LCD 210 is not pressed (No in Act 1214), the processing returns to Act 1204 and the capturing section 701 continues to capture image data picked up by the camera 203.

The settlement terminal 201 according to this embodiment includes the camera 203 configured to pick up an image including a commodity image of a commodity to be subjected to sales registration, the capturing section 701 configured to capture image data of the image picked up by the camera 203, the reading section 702 configured to read commodity information indicating the commodity to be subjected to the sales registration from the captured image data, and the storage control section 704 configured to cause the commodity master file T, which stores commodity information indicating commodities and commodity images indicated by the commodity information in association with each other, to store the read commodity information and the captured image data in association with each other. Consequently, the operator does not need to pick up an image of a commodity and cause the commodity master file T to store commodity information and a commodity image using the picked-up image of the commodity. Therefore, it is possible to quickly perform storage of the commodity information and the commodity image in the commodity master file T and realize simplification of maintenance of the commodity master file T.

The computer program executed by the settlement terminal 201 according to this embodiment may be provided while being incorporated in the ROM 256 or the like in advance. The computer program executed by the settlement terminal 201 according to this embodiment may be provided while being recorded in a computer-readable recording medium such as a CD-ROM, a flexible disk (FD), a CD-R, or a DVD (Digital Versatile Disk) as a file of an installable format or an executable format.

Further, the computer program executed by the settlement terminal 201 according to this embodiment may be stored on a computer connected to a network such as the Internet and provided while being downloaded through the network. The computer program executed by the settlement terminal 201 according to this embodiment may be provided or distributed through the network such as the Internet.

In another embodiment, a situation can be assumed in which commodity information is stored but a commodity image is not stored in the commodity master file T. If a commodity image is not stored in the commodity master file T, the storage control section 704 causes the commodity master file T to store image data captured by the capturing section 701 in association with commodity information same as commodity information read by the reading section 702 among the commodity information stored in the commodity master file T. In other words, the storage control section 704 does not cause the commodity master file T to store the commodity information read by the reading section 702 and causes the commodity master file T to store only the captured image data. In this embodiment, if the storage control section 704 causes the commodity master file T to store only the captured image data, this is equivalent to causing the commodity master file T to store the read commodity information and the captured image data in association with each other.

Further effects and modifications can be easily derived by those skilled in the art. Therefore, a wider mode of the present invention is not limited by the specific details and the representative embodiments represented and described above. Therefore, various changes are possible without departing from the spirit or the scope of the general concept of the invention defined by the appended claims and equivalents of the claims.

What is claimed is:

1. A code reading apparatus comprising:
an image pickup section configured to pick up an image including an image of a commodity to be subjected to sales registration;
a reading section configured to read commodity information indicating the commodity to be subjected to the sales registration from the picked-up image; and
a storage control section configured to store, to a commodity master file in which commodity information indicating a commodity and a commodity image of the commodity indicated by the commodity information are stored in association with each other, the picked-up image as the commodity image in association with the read commodity information; and
a weight check section configured to measure a weight of the commodity, wherein
if the read commodity information is not stored in the commodity master file, the storage control section stores the picked-up image in association with the read commodity information to the commodity master file,
the reading section reads, from the picked-up image, at least one of a commodity code of the commodity to be subjected to the sale registration, a unit price of the commodity, and a commodity name of the commodity as the commodity information,
the reading section reads, from the picked-up image, at least information of the unit price of the commodity and information of a volume of the commodity by optical character recognition,
the weight check section compares the information of the volume of the commodity with the weight measured by the weight check section to determine whether the information of the volume corresponds to the weight,
if the weight check section determines that the information of the volume corresponds to the weight the storage control section registers the picked-up image, the information of the unit price, and the information of the volume in the commodity master file.

2. The apparatus according to claim 1, wherein the storage control section stores, in subjecting the commodity to the sales registration, the picked-up image in association with the read commodity information to the commodity master file.

3. The apparatus according to claim 1, further comprising a display control section configured to display, on a display section on which a touch panel is laminated and arranged, a button for instructing the sales registration for the commodity on which the commodity image stored in the commodity master file is displayed.

4. A code reading method comprising:
capturing an image including an image of a commodity to be subjected to sales registration picked up by an image pickup section;
first reading commodity information indicating the commodity to be subjected to the sales registration from the picked-up image;
first storing, to a commodity master file in which commodity information indicating a commodity and a commodity image of the commodity indicated by the commodity information are stored in association with each other, the picked-up image as the commodity image in association with the commodity information read at the first section;
measuring a weight of the commodity;
second storing, if the commodity information read at the first reading is not stored to the commodity master file, the picked-up image in association with the commodity information read at the first reading to the commodity master file; and
second reading, from the picked-up image, at least one of a commodity code of the commodity to be subjected to the sale registration, a unit price of the commodity, and a commodity name of the commodity as the commodity information, wherein
the second reading further includes reading, from the picked-up image, at least information of the unit price of the commodity and information of a volume of the commodity by optical character recognition,
the measuring further includes comparing the information of the volume of the commodity with the weight measured at the measuring to determine whether the information of the volume corresponds to the weight, and
if the information of the volume is determined to correspond to the weight at the determining, the second storing includes registering the picked-up image, the information of the unit price, and the information of the volume in the commodity master file.

5. The method according to claim 4, further comprising third storing, in subjecting the commodity to the sales registration, the picked-up image in association with the commodity information read at the first reading to the commodity master file.

6. The method according to claim 4, further comprising displaying, on a display section on which a touch panel is laminated and arranged, a button for instructing the sales registration for the commodity on which the commodity image stored in the commodity master file is displayed.

* * * * *